(12) United States Patent
Chen et al.

(10) Patent No.: US 7,831,754 B1
(45) Date of Patent: Nov. 9, 2010

(54) MULTIPLE COMMUNICATION CHANNEL CONFIGURATION SYSTEMS AND METHODS

(75) Inventors: Zheng Chen, Allentown, PA (US); Glen Edward Offord, Macungie, PA (US); Jamie Freed, Fleetwood, PA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 463 days.

(21) Appl. No.: 11/551,459

(22) Filed: Oct. 20, 2006

(51) Int. Cl.
G06F 13/12 (2006.01)
G06F 13/38 (2006.01)
(52) U.S. Cl. .......................................... 710/71; 326/38
(58) Field of Classification Search ............. 326/38–41; 370/395.1; 341/52; 702/118; 375/257; 714/52, 714/701; 710/71
See application file for complete search history.

(56) References Cited

U.S. PATENT DOCUMENTS

| | | | | |
|---|---|---|---|---|
| 5,748,887 | A * | 5/1998 | Kim et al. ..................... | 714/52 |
| 6,483,342 | B2 | 11/2002 | Britton et al. | |
| 6,738,935 | B1 * | 5/2004 | Kimmitt ..................... | 714/701 |
| 6,940,779 | B2 * | 9/2005 | Chen et al. ............. | 365/230.03 |
| 7,058,535 | B2 * | 6/2006 | Chenoweth et al. ......... | 702/118 |
| 7,112,993 | B2 * | 9/2006 | Speers .......................... | 326/38 |
| 7,191,262 | B2 * | 3/2007 | Sleeman ...................... | 710/62 |
| 7,230,549 | B1 * | 6/2007 | Woodral et al. .............. | 341/52 |
| 7,243,173 | B2 * | 7/2007 | Campbell ..................... | 710/71 |
| 7,295,618 | B2 * | 11/2007 | Hsu et al. ................... | 375/257 |
| 7,343,535 | B2 * | 3/2008 | Lai ............................. | 714/724 |
| 2004/0252713 | A1 * | 12/2004 | Taylor et al. ................ | 370/437 |
| 2005/0235072 | A1 * | 10/2005 | Smith et al. .................. | 710/22 |
| 2005/0251713 | A1 * | 11/2005 | Lee ............................. | 714/718 |
| 2005/0271064 | A1 * | 12/2005 | Chang et al. ................ | 370/397 |

OTHER PUBLICATIONS

Lattice Semiconductor Corporation, "sysHSI Block Usage Guidelines" Technical Note, TN1020, Apr. 2006.
Lattice Semiconductor Corporation, "ispGDX2 Family" Data Sheet, pp. 1-22, Sep. 2005.

* cited by examiner

Primary Examiner—Rexford N Barnie
Assistant Examiner—Crystal L Hammond
(74) Attorney, Agent, or Firm—Haynes and Boone, LLP

(57) ABSTRACT

An integrated circuit includes, in accordance with an embodiment of the present invention, a data port, a system bus for transferring information to and from the data port, and a plurality of SERDES channels. A plurality of registers associated with the plurality of SERDES channels may be written to via the system bus on an individual, group, or global basis to provide communication settings for the SERDES channels.

20 Claims, 7 Drawing Sheets

MULTIPLE COMMUNICATION CHANNEL CONFIGURATION SYSTEMS AND METHODS

TECHNICAL FIELD

The present invention relates generally to electrical circuits and, more particularly, to configuration techniques, such as for configuration of input/output channels in a programmable logic device.

BACKGROUND

Programmable logic devices (PLDs) are used in a wide variety of applications and, as the PLDs have grown in complexity, are increasingly relied upon to perform various functions. For example, a PLD (e.g., a field programmable gate array (FPGA) or a complex programmable logic device (CPLD)) may provide high-speed serializer/deserializer (SerDes or SERDES) channels and their associated programmable physical coding sub-layer (PCS) logic for communication applications.

A conventional approach for programming the SERDES channels uses the PLD's configuration memory cells to control all of the SERDES/PCS settings. However, a PLD reconfiguration (e.g., with a different bitstream) is then required for every SERDES/PCS setting change, which may be particularly burdensome for dynamic adjustments of SERDES/PCS settings (e.g., during the prototyping phase).

Another conventional approach uses byte-based register files (e.g., accessed via a system bus) to control all SERDES/PCS settings. For example, the SERDES/PCS settings may be programmed or modified or verified by system bus write/read transfers during and after bitstream downloading, with each byte of register file having a unique address and accessed individually. However, this approach requires multiple bus transfers of the same data to different addresses if a group of SERDES channels or all of the SERDES channels require the same settings.

As a result, there is a need for improved techniques for implementing input/output circuits and configuring input/output settings, such as for example SERDES/PCS settings.

SUMMARY

In accordance with one embodiment of the present invention, an integrated circuit includes a data port; a system bus for transferring information to and from the data port; a plurality of SERDES channels; and a plurality of registers associated with the plurality of SERDES channels, wherein the registers are writeable via the system bus on an individual, group, or global basis to provide communication settings for the SERDES channels.

In accordance with another embodiment of the present invention, an integrated circuit includes a system bus; a plurality of SERDES channels; a plurality of registers associated with the plurality of SERDES channels; and means for interfacing the system bus to the plurality of registers to read from or write to the registers, wherein the registers are writeable via the system bus on an individual, group, or global basis to provide communication standard settings for the SERDES channels.

In accordance with another embodiment of the present invention, a method of providing SERDES channel settings includes providing a plurality of SERDES channels; providing a plurality of registers associated with the plurality of SERDES channels and adapted to store the SERDES channel settings; and interfacing a system bus to the plurality of registers to read from or write to the registers, wherein the registers are writeable via the system bus on an individual, group, or global basis to provide communication settings for the SERDES channels.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
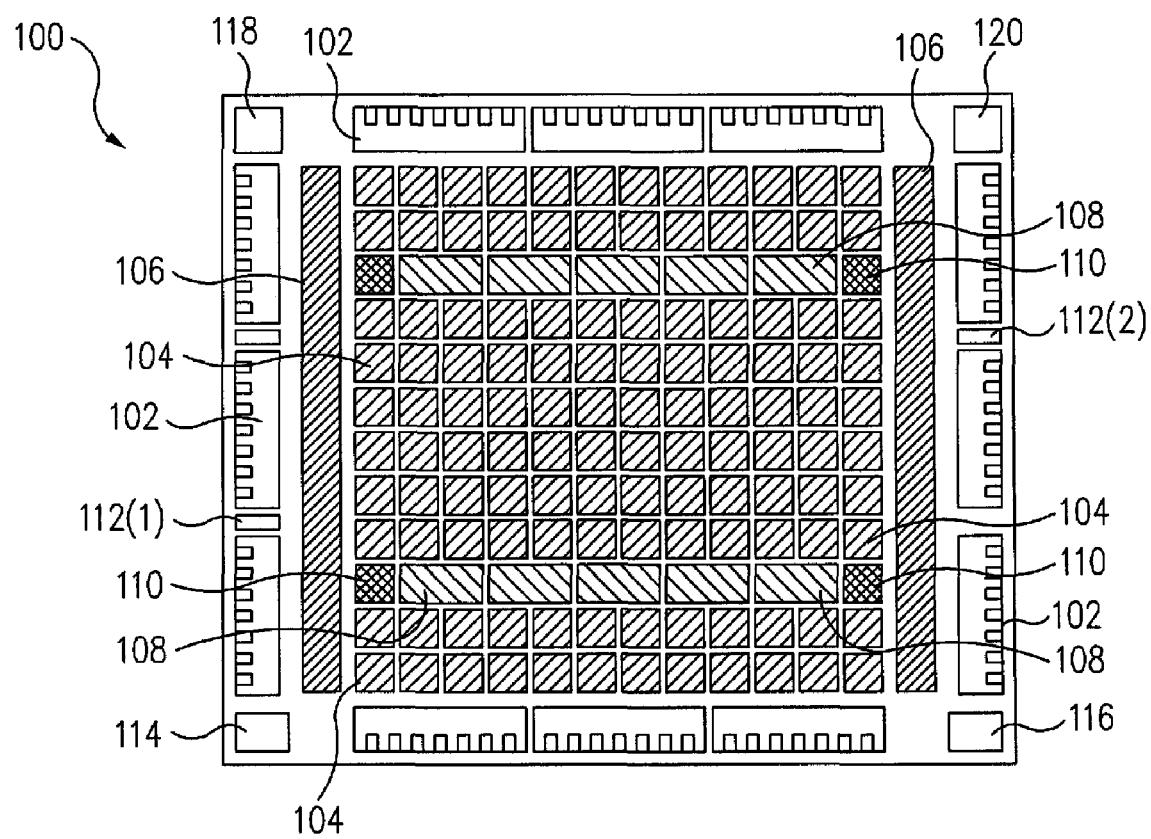
FIG. 1 shows a block diagram illustrating an exemplary programmable logic device in accordance with an embodiment of the present invention.

FIG. 1 shows a block diagram illustrating an exemplary programmable logic device (PLD) 100 in accordance with an embodiment of the present invention. PLD 100 generally includes input/output (I/O) blocks 102 and programmable logic blocks 104. I/O blocks 102 provide I/O functionality (e.g., supports one or more I/O and/or memory interface standards) for PLD 100. Programmable logic blocks 104 (e.g., also referred to in the art as configurable logic blocks or logic array blocks) provide logic functionality for PLD 100, such as LUT-based logic typically associated with FPGAs or array-based logic typically associated with CPLDs.

PLD 100 may also include reprogrammable non-volatile memory 106 (e.g., blocks of EEPROM or flash memory), volatile memory 108 (e.g., block SRAM), clock-related circuitry 110 (e.g., PLL circuits), one or more data ports 112, configuration memory 114, an interconnect 116, a system bus 118, and/or a communication channel 120. Non-volatile memory 106, for example, may be used to store configuration data within PLD 100 for transfer to configuration memory 114 of PLD 100 upon power up or during reconfiguration of PLD 100. This may drastically reduce the time to reconfigure PLD 100 relative to an external bitstream (e.g., reduce the time from seconds to microseconds for loading of configuration data into configuration memory 114).

Data port 112 may be used for programming PLD 100, as would be understood by one skilled in the art. For example, data port 112(1) may represent a programming port such as a central processing unit (CPU) port (also referred to as a peripheral data port, a microprocessor interface, or a sysCONFIG programming port) and/or a serial peripheral interface (SPI) port. For example, data port 112 may be coupled to system bus 118 to provide functionality as discussed further herein. Data port 112(2) may represent, for example, a programming port such as a joint test action group (JTAG) port by employing standards such as Institute of Electrical and Electronics Engineers (IEEE) 1149.1 or 1532 standards. Data ports 112(1) and 112(2) are not both required, but one or the other or both may be included to receive configuration data and commands, depending upon the desired application and requirements as would be understood by one skilled in the art.

It should be understood that the number and placement of the various elements (some of which may be optional), such as I/O blocks 102, logic blocks 104, non-volatile memory 106, volatile memory 108, clock-related circuitry 110, data port 112, configuration memory 114, interconnect 116, system bus 118, and communication channel 120 is not limiting and may depend upon the desired application. Furthermore, it should be understood that the elements are illustrated in block form for clarity and that certain elements, such as configuration memory 114, interconnect 116, and system bus 118, would typically be distributed throughout PLD 100 (e.g., in and between logic blocks 104) to perform their conventional functions (e.g., storing configuration data that configures PLD 100, providing programmable routing resources, and providing system bus functionality, respectively).

In accordance with an embodiment of the present invention, one or more of communication channels 120 may function to provide a number of SERDES channels and associated PCS logic. For example, the SERDES/PCS channels within PLD 100 may be individually programmed to support different communication standards, programmed to function in groups with each group supporting a different communication standard, or all programmed (i.e., on a global basis) to support one communication standard. As explained further herein, systems and methods are provided in accordance with one or more embodiments of the present invention that may provide efficient techniques for configuring SERDES channels via system bus 118.

Figure 2A:
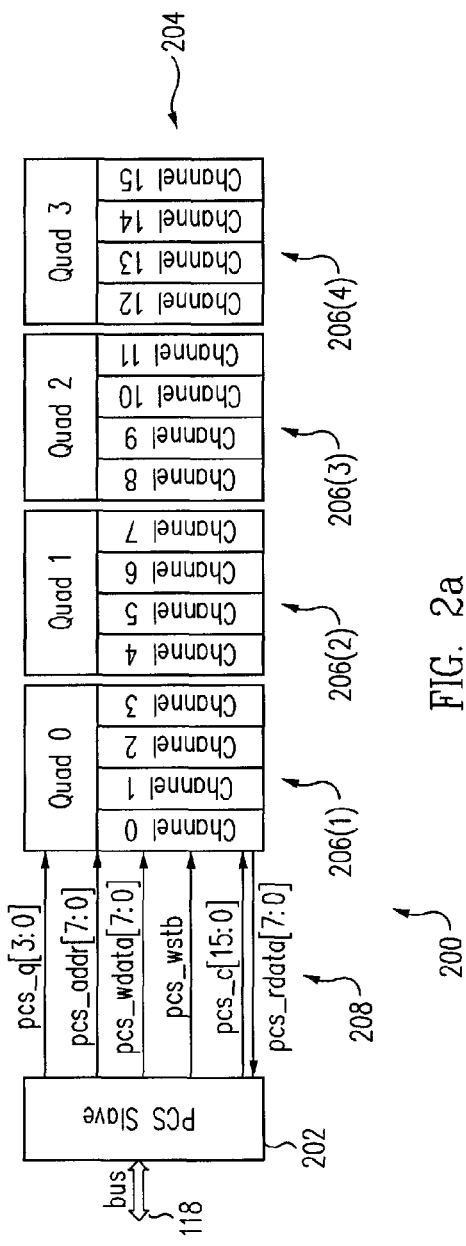
FIGS. 2a and 2b show block diagrams illustrating an exemplary portion of the programmable logic device of FIG. 1 in accordance with an embodiment of the present invention.

As an example, FIG. 2a shows a block diagram of an exemplary circuit 200 illustrating a portion of PLD 100 (e.g., within one of communication channels 120) of FIG. 1 in accordance with an embodiment of the present invention. Circuit 200 includes a PCS block 202 and one or more SERDES channels 204, which for this example are shown as sixteen SERDES channels 204 organized into blocks of four (quad) and separately referenced as quad SERDES channels 206(1) through 206(4).

PCS block 202 provides PCS logic (e.g., lane alignment, coding, decoding, and other PCS-related functions, such as physical layer functionality and various data protocol support) and interfaces with system bus 118. System bus 118 may represent any type of system bus for communicating information (e.g., control, data, or other information) between circuit 200 and another circuit or device (e.g., a CPU such as a microprocessor).

For example, system bus 118 may represent an embedded system bus for supporting one or more master elements and one or more slave elements, where circuit 200 represents one slave element. A master element may be within PLD 100 or may be external to PLD 100 and interface with system bus 118, for example, via data port 112(1). Further details regarding an exemplary system bus for system bus 118 may be found, for example, in U.S. Pat. No. 6,483,342 entitled "Multi-Master Multi-Slave System Bus in a Field Programmable Gate Array (FPGA)" and issued Nov. 19, 2002.

As an example, Table 1 provides a list of exemplary signals that may be transmitted through system bus 118 (e.g., for 32 bit words). The signals and the corresponding description provide an exemplary illustration of information communicated to or from PCS block 202.

TABLE 1

| Signal | Description |
| --- | --- |
| fs_addr [17:0] or FSADDR | 18-bit Address from system bus to PCS slave |
| fs_wdata [7:0] or FSWDATA | 8-bit Data from system bus to PCS slave |
| fs_rdata [7:0] or FSRDATA | 8-bit Read data from PCS slave to system bus |
| fs_wrn or FSWRN | Write (High) Read (Low) signal to PCS slave |
| fs_rdy or FSRDY | Data Ready signal to PCS slave to indicate address and data ready for write or address ready for read |
| fs_ack or FSACK | Transfer acknowledge signal from PCS slave to extend wait states, with no wait states for write and one for read |
| fs_hclk or HCLK | System bus clock (e.g., 200 MHz) to PCS slave |
| pcs_int_q0 or PCSINTQ0 | Interrupt from PCS logic going to the PLD |

PCS block 202 communicates with quad SERDES channels 206(1) through 206(4) via interface signals 208. For example, Table 2 provides a list of exemplary signals, some of which are shown in FIG. 2, which may be transmitted between PCS block 202 and quad SERDES channels 206(1) through 206(4). For example, the address bus signal (pcs_addr[7:0]), the write data bus signal (pcs_wdata[7:0]), and the write strobe signal (pcs_wstb) may be connected to all channel registers (for the sixteen channels in this example) and all quad registers (for the four quads in this example). The read data bus signal (pcs_rdata[7:0]) may be implemented as a chained read data bus through all registers.

TABLE 2

| Signal | Description |
| --- | --- |
| pcs_addr [7:0] | 8-bit address to select a register |
| pcs_wdata [7:0] | 8-bit data to be written |
| pcs_wstb or pcs_wstrb | Write Strobe (signals a write operation) |
| pcs_rd | Read Strobe (signals a read operation) |
| pcs_qx or pcs_q or cs_qx | Selects one of four possible quads |
| pcs_qxcy or pcs_c or cs_qxcy | Selects one of sixteen possible channels |
| pcs_rdata [7:0] | Read data from PCS logic |
| pcs_int_q0 | Interrupt from PCS Logic |

Figure 2B:
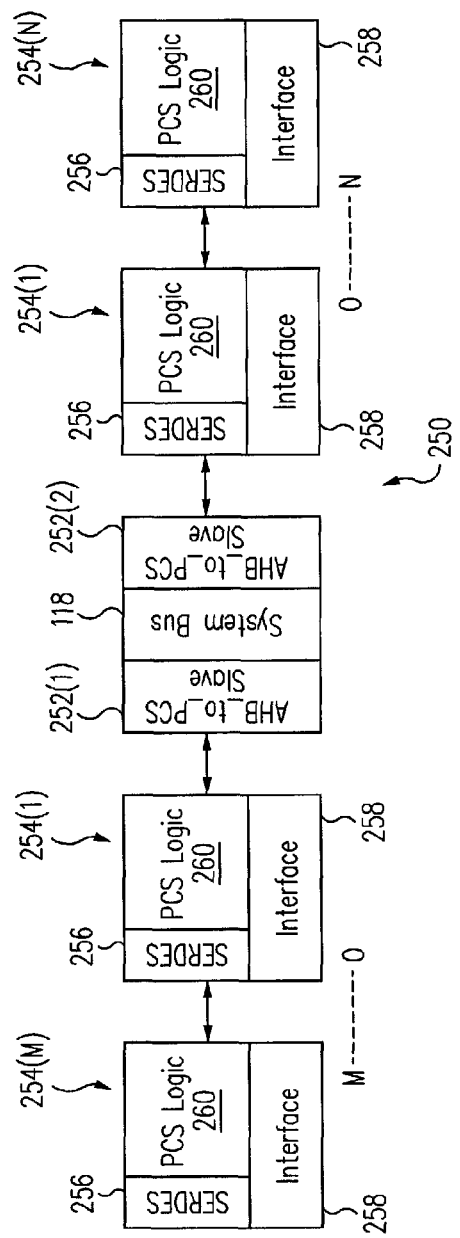

As another example, FIG. 2b shows a block diagram of an exemplary circuit 250 illustrating a portion of PLD 100 (e.g., within one of communication channels 120) of FIG. 1 in accordance with an embodiment of the present invention. Circuit 250 includes interface blocks 252 and SERDES/PCS blocks 254. Interface block 252(1) provides an interface between system bus 118 and SERDES/PCS blocks 254(1) through 254(M), while interface block 252(2) provides an interface between system bus 118 and SERDES/PCS blocks 254(1) through 254(N), where "N" and "M" are each any desired number. As an example, system bus 118 may represent an advanced high-performance bus (AHB based on the advanced microcontroller bus architecture (AMBA) specification), with interface block 252 (e.g., labeled AHB_to_PCS Slave interface) functioning as a corresponding interface between system bus 118 and SERDES/PCS blocks 254.

Each SERDES/PCS block 254 (e.g., SERDES/PCS block 254(M)) includes one or more SERDES channels 256, a PCS logic block 260, and an interface 258. For example, SERDES channels 256 may represent four SERDES channels and thus each SERDES/PCS block 254 provides four SERDES channels (e.g., a quad, similar to quad SERDES channel 206(1) of FIG. 2a).

PCS logic block 260 provides the PCS logic, similar to PCS block 202 (FIG. 2a), while interface 258 provides various interface support for each SERDES/PCS block 254. For example, interface 258 may provide microprocessor interface (MPIF) support along with channel interface (CHIF) and/or quad interface (QIF), depending upon the specific implementation and desired application.

Figure 3:
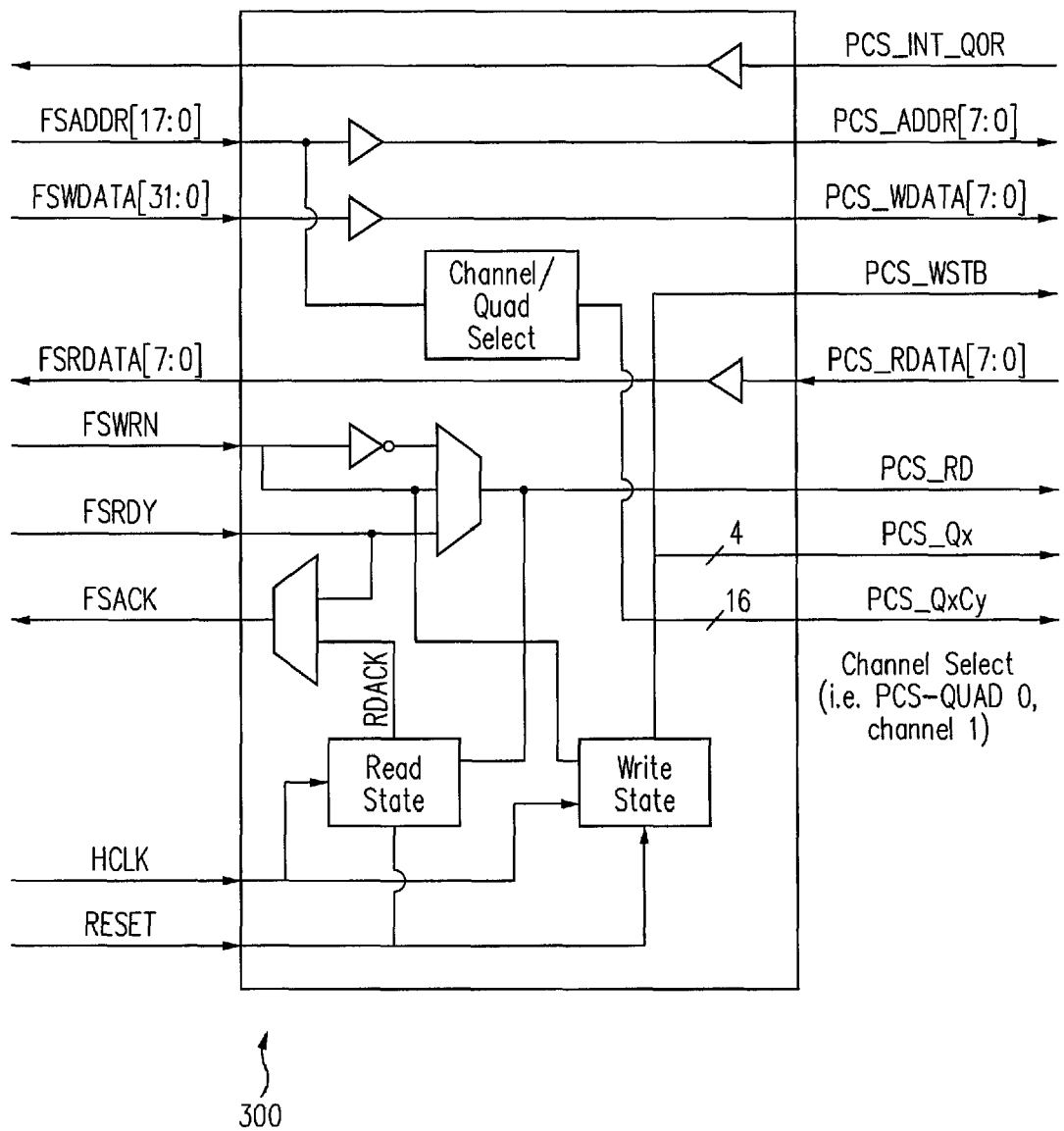
FIG. 3 shows a block diagram illustrating an exemplary portion of the block diagram of FIG. 2b in accordance with an embodiment of the present invention.
Figure 5:
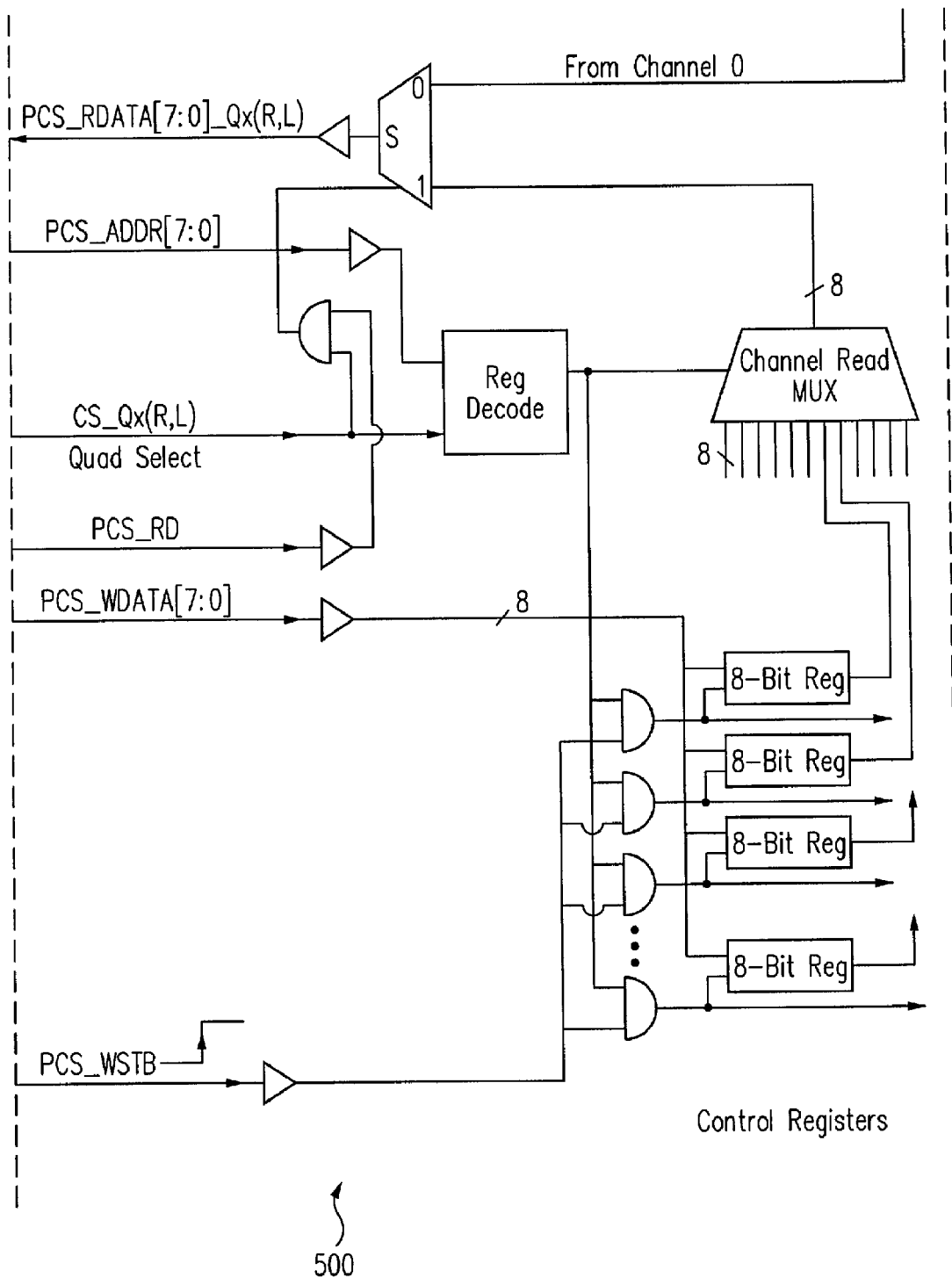
FIG. 5 shows a block diagram illustrating an exemplary portion of the block diagram of FIG. 2b in accordance with an embodiment of the present invention.
Figure 6:
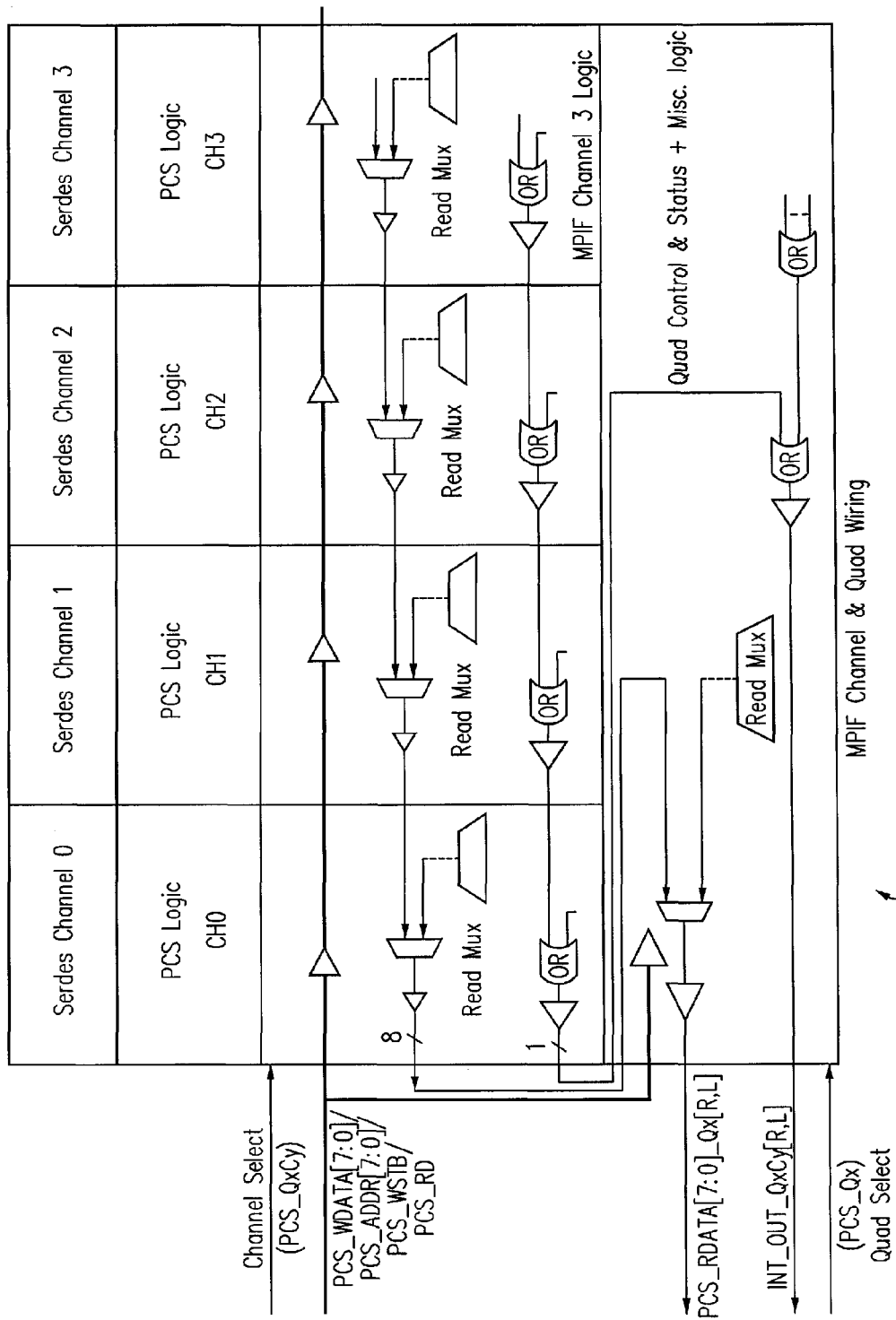
FIG. 6 shows a block diagram illustrating an exemplary portion of the block diagram of FIG. 2b in accordance with an embodiment of the present invention.
Figure 7:
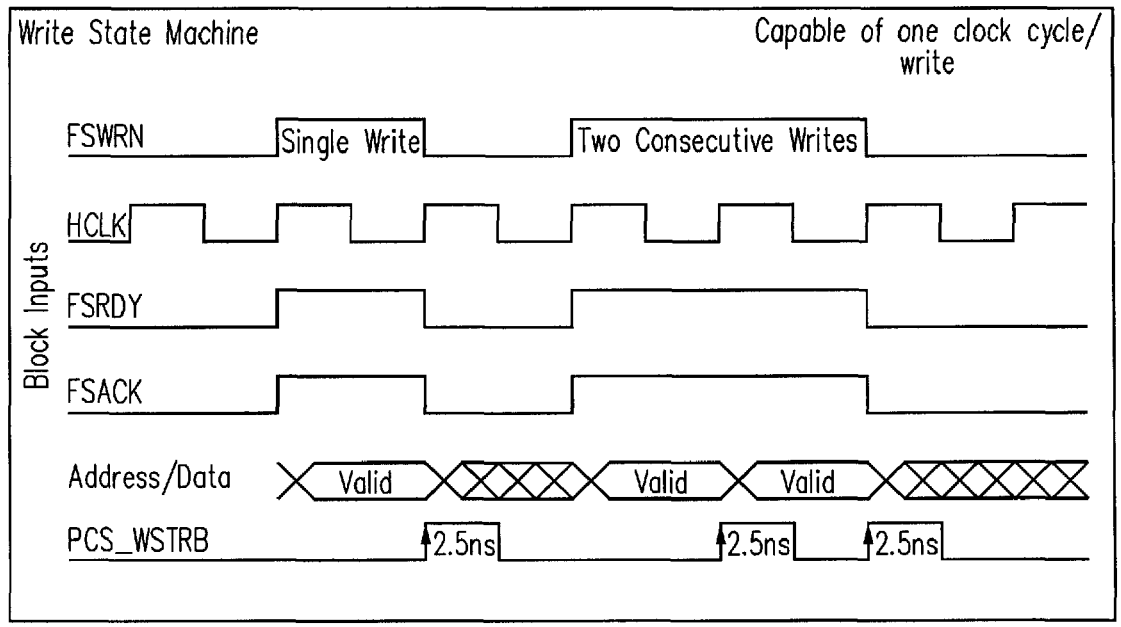
FIG. 7 shows exemplary timing diagrams for the block diagram of FIG. 2b in accordance with an embodiment of the present invention.
Figure 7:
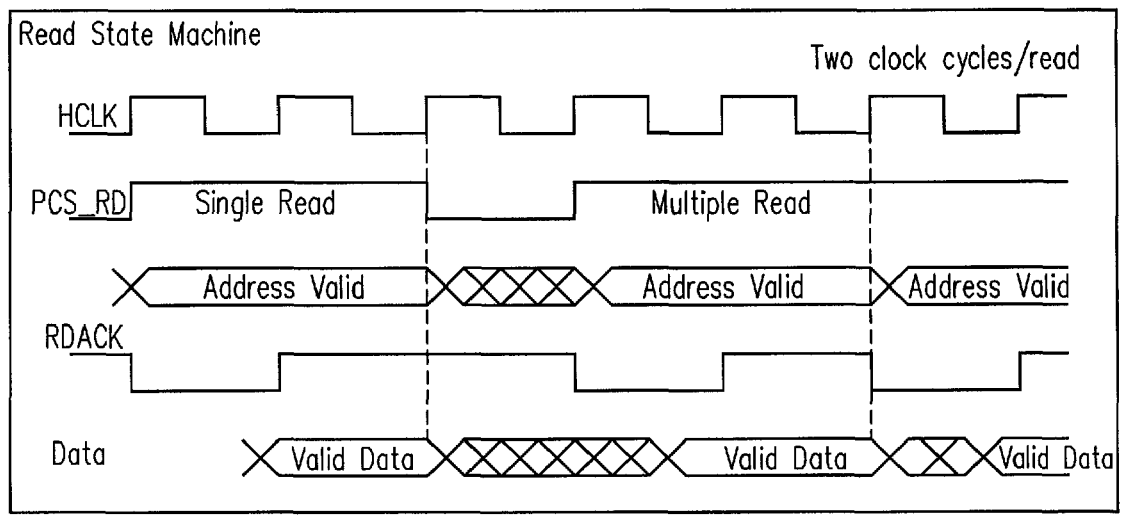

As a specific implementation example, FIGS. 3-6 illustrate exemplary circuit implementations for various portions of circuit 250 and FIG. 7 illustrates an exemplary timing diagram for various signals associated with circuit 250 and described in Tables 1 and 2. For example, FIG. 3 shows a block diagram illustrating an exemplary circuit 300 implementation for interface block 252(2) of FIG. 2b in accordance with an embodiment of the present invention. As illustrated, circuit 300 provides an interface between system bus 118 and SERDES/PCS blocks 254(1) through 254(N) (i.e., the right-hand portion (R) of circuit 250) for various signals, such as described in Tables 1 and 2 herein. A similar circuit would be provided for interface block 252(1) to provide an interface for SERDES/PCS blocks 254(1) through 254(M) (i.e., the left-hand portion (L) of circuit 250, with for example at least some of the signals duplicated for the left and right hand portions supported by corresponding interface blocks 252(1) and 252(2)). Circuit 300 also includes read/write state logic and channel/quad select logic, as illustrated in FIG. 3, to provide broadcast or select broadcast and configuration writing of PCS registers.

Figure 4:
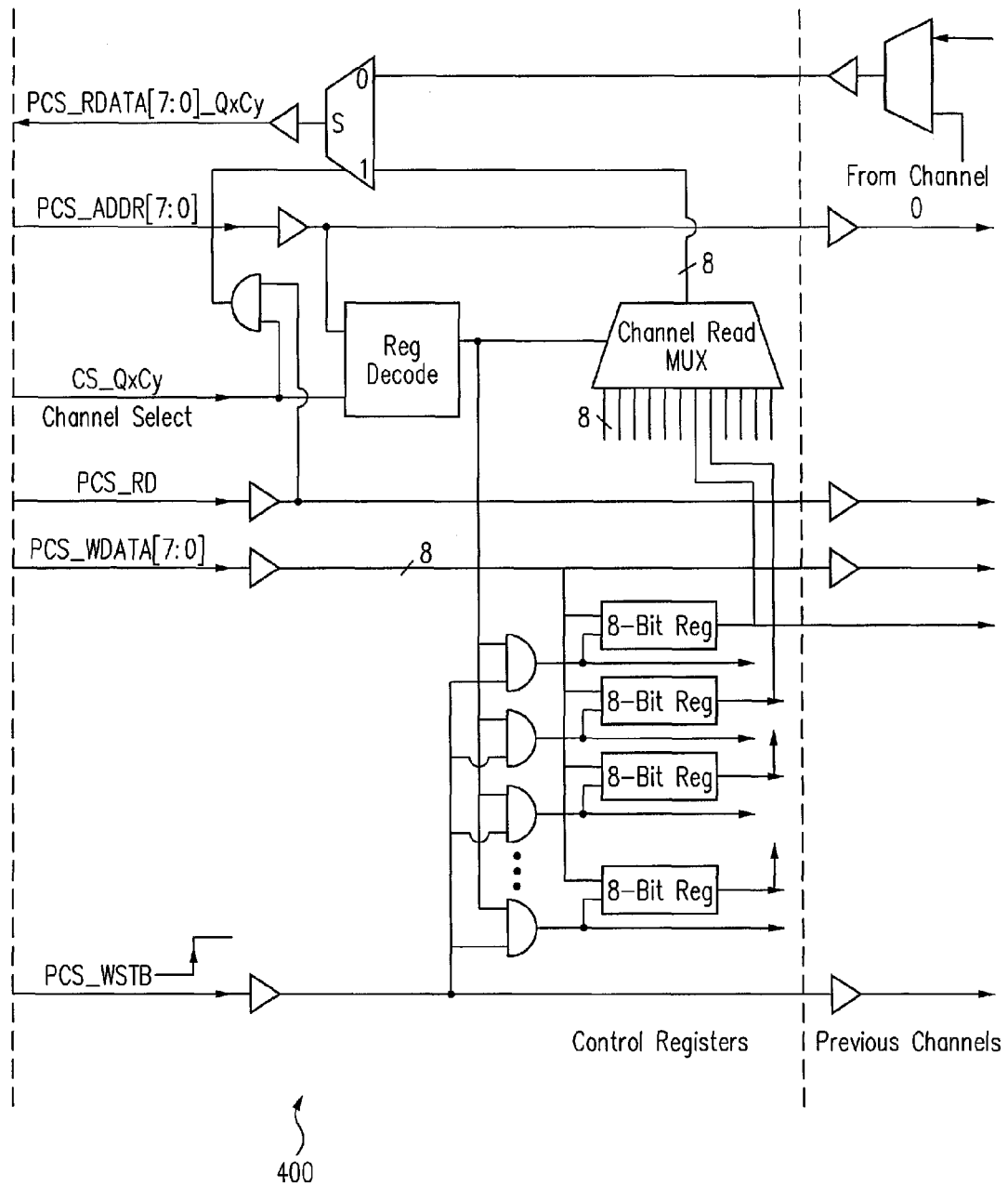
FIG. 4 shows a block diagram illustrating an exemplary portion of the block diagram of FIG. 2b in accordance with an embodiment of the present invention.

FIG. 4 shows a block diagram illustrating an exemplary circuit 400 implementation for CHIF functionality of interface block 258 of FIG. 2b in accordance with an embodiment of the present invention. For example, one circuit 400 is provided for each PCS channel (receiver/transmitter SERDES pair, e.g., each SERDES channel 256 within SERDES/PCS block 254) to provide a local MPIF with associated registers for the PCS channel. Thus, for the example above, four of circuits 400 are within one SERDES/PCS block 254 for the corresponding four SERDES channels 256. As shown, the address and data buses may be buffered (e.g., byte wide buses) to drive other circuits 400 as well as local logic.

FIG. 5 shows a block diagram illustrating an exemplary circuit 500 implementation for QIF functionality of interface block 258 of FIG. 2b in accordance with an embodiment of the present invention. Circuit 500 is provided for each SERDES/PCS block 254 to support, for example, MPIF and provide status and registers for the quad implementation as a whole, based on the example above. Thus as an example, MPIF requirements and registers are handled for block level designs, with register control signals provided as block inputs, status signals provided as block outputs, and the read strobe for all byte-wide reads are provided by the MPIF.

In general, circuit 300 provides address, data, and control information to circuits 400 (CHIF) and 500 (QIF). The control information may include a write strobe (pcs_rd) and a read strobe (pcs_wstb), a four quad select signal (cs_qx or pcs_qx), and a 16 SERDES channel select signal (cs_qxcy or pcs_qxcy), where "x" ranges from 0 to 3 and "y" ranges from 0 to 15 for quad number and channel number, respectively. Circuit 300 accepts byte-wide read data from circuits 400 and 500, with the read operation taking two clock cycles and the write taking one clock cycle for this exemplary implementation (e.g., as illustrated in FIG. 7). Circuit 300 further supports a broadcast mode, which allows simultaneous writes to the same register in all selected quads (i.e., SERDES/PCS blocks 254).

FIG. 6 shows a block diagram illustrating an exemplary circuit 600 implementation for channel and quad wiring for interface block 258 of FIG. 2b in accordance with an embodiment of the present invention. FIG. 7 shows exemplary timing diagrams 700 and 750 illustrating exemplary write and read signal timing, respectively, for circuit 250 of FIG. 2b in accordance with an embodiment of the present invention. As an example, timing diagram 700 illustrates write state machine timing for one clock cycle per write, while timing diagram 750 illustrates read state machine timing for two clock cycles per read.

In accordance with an embodiment of the present invention, the PCS address space (e.g., 18 bits from A0 to A17), for this example, may be provided as illustrated in Table 3, while the mode select bits of Table 3 may be defined as set forth in Table 4. In Table 3, bit A15 selects the right side associated with interface block 252(2) or the left side associated with interface block 252(1). It should be understood that the addresses or additional addresses may be provided to select various modes. For example, address 11x1100100xxxxxxxx may represent the address to broadcast to all quad registers on the left or right side, while address 1111101111xxxxxxxx may represent the address for a global cascade/align of logic registers.

TABLE 3

| PCS Space Select | R/L Select | Mode Select | Channel/Quad Select | Register Select |
|---|---|---|---|---|
| A17 and A16 | A15 | A14 thru A12 | All thru A8 | A7 thru A0 |
| 11 | 0/1 for Right/Left | 000 | 0000 | 00000000 |

TABLE 4

| Mode Select | Description |
|---|---|
| 000 | Broadcast write to all channels of Quad 0 |
| 001 | Broadcast write to all channels of Quad 1 |
| 010 | Broadcast write to all channels of Quad 2 |
| 011 | Broadcast write to all channels of Quad 3 |
| 100 | Broadcast write to all channels on the right or left side (e.g., simultaneous write to the same register in all selected channels of each quad) |
| 101 | Single channel select mode, where Channel Select of Table 3 selects one of sixteen channels (e.g., per side), with Channel Select = 0000 thru 1111 for channels 0 thru 15 |
| 110 | Quad select mode, where Quad Select of Table 3 selects one of four quads (e.g., per side), with Quad Select = 0000 thru 0011 for quads 0 thru 3 and 0100 to broadcast to all four quads |
| 111 | Reserved for PLD logic programming |

In general in accordance with one or more embodiments of the present invention, system bus capability is used to broadcast a setting to a group of SERDES/PCS channels or to all SERDES/PCS channels in one bus transfer by proper allocation of the bus address space. Thus, address space may be allocated for each channel, for each group of channels, or for all channels.

For example, when a configuration setting for a specific SERDES/PCS channels is desired, one bus transfer is addressed directly to that SERDES/PCS channel. If the same configuration setting for a specific group of SERDES/PCS channels is desired, one bus transfer is broadcast directly to the SERDES/PCS channels in that group. Similarly, if the same configuration setting for all SERDES/PCS channels is desired, one bus transfer is broadcast directly to all of the SERDES/PCS channels (e.g., one transfer to the address space reserved for the all SERDES/PCS channels broadcast). Therefore, each byte of the register file can be set by a transfer to three different addresses (i.e., individual, group, and universal) and each SERDES/PCS channel register has its own enable signal, which can be asserted by the address decoder at multiple sections of the address space.

As a specific example and as discussed above (i.e., 16 SERDES/PCS channels divided into 4 groups with 4 SERDES/PCS channels in each group (i.e., 4 quads), each SERDES/PCS channel may have 256 bytes of register file (channel register) for specific channel settings and each quad may also have 256 bytes of register file (quad register) for common settings among the four SERDES/PCS channels in the quad. As another specific example, if a write transfer from system bus 118 is addressing 0x110_001_0000_00001111, then 4 bits of pcs_c[7:4] will be asserted and byte 0x0F of channels 4 to 7 are written at the same time. If a read transfer is addressing a broadcast section, the chained read data bus would pick the nearest channel register's data output while discarding the outputs from the other registers selected.

Systems and methods are disclosed herein to provide improved input/output techniques. For example, in accordance with an embodiment of the present invention, a technique is disclosed for broadcasting configuration of SERDES channels (e.g., within an FPGA). As disclosed herein, an address scheme and corresponding architecture may provide certain advantages relative to conventional approaches for setting SERDES/PCS channels or other I/O settings. Furthermore, by placing the address decoder in a PCS slave interface and generating select signals for each channel/quad register, in one embodiment, the interface design and register file design may be simplified.

Embodiments described above illustrate but do not limit the invention. It should also be understood that numerous modifications and variations are possible in accordance with the principles of the present invention. For example, although the techniques disclosed herein have been illustrated for a PLD application, the techniques may also be applied to any type of integrated circuit as would be understood by one skilled in the art. Accordingly, the scope of the invention is defined only by the following claims.

What is claimed is:

1. An integrated circuit comprising:
a data port;
a system bus for transferring information to and from the data port;
a plurality of SERDES channels; and
a plurality of registers associated with the plurality of SERDES channels,
wherein the registers are writeable to via the data port and system bus on an individual, group, and global basis to provide communication settings for the SERDES channels.

2. The integrated circuit of claim 1, further comprising:
physical coding sublayer logic associated with the plurality of SERDES channels; and
an interface circuit for interfacing the system bus with the SERDES channels, physical coding sublayer logic, and the registers.

3. The integrated circuit of claim 1, further comprising:
physical coding sublayer logic associated with the plurality of SERDES channels; and
wherein the plurality of SERDES channels are organized into a number of groups along with the corresponding physical coding sublayer logic and the associated registers to form SERDES/PCS blocks, with each of the SERDES/PCS blocks having a number of SERDES channels, and wherein the integrated circuit further comprises an interface circuit adapted to interface the system bus with the SERDES/PCS blocks.

4. The integrated circuit of claim 3, wherein the interface circuit comprises a first interface circuit adapted to interface the system bus with a first number of the SERDES/PCS blocks and a second interface circuit adapted to interface the system bus with a second number of SERDES/PCS blocks.

5. The integrated circuit of claim 1, further comprising:
physical coding sublayer logic associated with the plurality of SERDES channels; and
wherein the plurality of SERDES channels are organized into a number of groups along with the corresponding physical coding sublayer (PCS) logic and the associated registers to form SERDES/PCS blocks, with each of the SERDES/PCS blocks having a number of SERDES channels, wherein the integrated circuit further comprises an interface circuit adapted to interface the system bus with the SERDES/PCS blocks; and wherein each of the SERDES/PCS blocks further comprises an interface block comprising:
a channel interface circuit, corresponding to each SERDES channel within the SERDES/PCS block, adapted to interface the registers designated to store channel settings with the interface circuit; and
a group interface circuit, corresponding to each SERDES/PCS block, adapted to interface the registers designated to store common channel settings with the interface circuit.

6. The integrated circuit of claim 1, wherein the integrated circuit comprises a programmable logic device, with the system bus coupled to the data port providing a microprocessor interface.

7. The integrated circuit of claim 1, further comprising:
physical coding sublayer logic associated with the plurality of SERDES channels; and
an interface circuit for interfacing the system bus with the SERDES channels, physical coding sublayer logic, and the registers, wherein the interface circuit provides a write data bus, an address bus, and a write strobe bus coupled to the registers.

8. The integrated circuit of claim 1, further comprising:
physical coding sublayer logic associated with the plurality of SERDES channels; and
an interface circuit for interfacing the system bus with the SERDES channels, physical coding sublayer logic, and the registers, wherein the interface circuit provides a chained read data bus coupled to the registers.

9. The integrated circuit of claim 1, wherein the integrated circuit comprises a programmable logic device having:
- a plurality of programmable logic blocks;
- configuration memory adapted to store configuration data to configure the programmable logic blocks;
- a volatile memory block adapted to store information during operation of the programmable logic device;
- a non-volatile memory block adapted to store configuration data for transfer to the configuration memory to configure the programmable logic blocks;
- input/output blocks adapted to transfer information into and out of the programmable logic device; and
- an interconnect configured based on the configuration data stored in the configuration memory and adapted to provide routing resources between the volatile memory block, the input/output blocks, and the programmable logic blocks.

10. An integrated circuit comprising:
- a system bus;
- a plurality of SERDES channels;
- a plurality of registers associated with the plurality of SERDES channels; and
- means for interfacing the system bus to the plurality of registers to read from or write to the registers, wherein the registers are writeable via the system bus on an individual, group, and global basis to provide communication standard settings for the SERDES channels.

11. The integrated circuit of claim 10, further comprising means for interfacing the system bus with an external device.

12. The integrated circuit of claim 10, wherein the plurality of SERDES channels are organized into a number of groups, with each of the groups further comprising:
- means for interfacing each of the registers designated to store individual SERDES channel settings with the system bus interfacing means; and
- means for interfacing each of the registers designated to store common SERDES channel group settings with the system bus interfacing means.

13. The integrated circuit of claim 10, further comprising a data port, and wherein the integrated circuit comprises a programmable logic device, with the system bus coupled to the data port providing a microprocessor interface.

14. The integrated circuit of claim 10, further comprising means for providing physical coding sublayer logic for the plurality of SERDES channels.

15. The integrated circuit of claim 10, wherein the integrated circuit comprises a programmable logic device having:
- a plurality of programmable logic blocks;
- configuration memory adapted to store configuration data to configure the programmable logic blocks;
- a volatile memory block adapted to store information during operation of the programmable logic device;
- a non-volatile memory block adapted to store configuration data for transfer to the configuration memory to configure the programmable logic blocks;
- input/output blocks adapted to transfer information into and out of the programmable logic device; and
- an interconnect configured based on the configuration data stored in the configuration memory and adapted to provide routing resources between the volatile memory block, the input/output blocks, and the programmable logic blocks.

16. A method of providing SERDES channel settings, the method comprising:
- providing a plurality of SERDES channels;
- providing a plurality of registers associated with the plurality of SERDES channels and adapted to store the SERDES channel settings;
- providing a system bus to the plurality of registers to read from or write to the registers; and
- writing to the registers via the system bus on an individual, group, and global basis to provide communication settings for the SERDES channels.

17. The method of claim 16, further comprising providing a data port to write to and read from the registers via the data port and the system bus.

18. The method of claim 16, wherein the plurality of SERDES channels are organized into a number of groups, with a first set of the registers adapted to store individual SERDES channel settings and a second set of the registers adapted to store common SERDES channel group settings.

19. The method of claim 16, wherein the plurality of SERDES channels are organized into a number of groups having associated physical coding sublayer logic, with a first set of the registers adapted to store individual SERDES channel settings and a second set of the registers adapted to store common SERDES channel group settings.

20. The method of claim 16, wherein the plurality of SERDES channels provides a programmable input/output interface within a programmable logic device.

* * * * *